US009880799B1

(12) United States Patent
Bertz et al.

(10) Patent No.: US 9,880,799 B1
(45) Date of Patent: Jan. 30, 2018

(54) EXTENDABLE DISPLAY SCREENS OF ELECTRONIC DEVICES

(71) Applicant: Sprint Communications Company L.P., Overland Park, KS (US)

(72) Inventors: Lyle T. Bertz, Lee's Summit, MO (US); Stephen J. Bye, Atlanta, GA (US); Von K. McConnell, Leawood, KS (US); Russell S. McGuire, Overland Park, KS (US); Joao Tex Teixeira, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 500 days.

(21) Appl. No.: 14/469,568

(22) Filed: Aug. 26, 2014

(51) Int. Cl.
*G06F 3/14* (2006.01)
*G02F 1/133* (2006.01)
*G09G 5/00* (2006.01)

(52) U.S. Cl.
CPC ............ *G06F 3/1446* (2013.01); *G02F 1/133* (2013.01); *G09G 5/00* (2013.01)

(58) Field of Classification Search
CPC ...... G06F 3/1446; G06F 3/1466; G02F 1/133; G09G 5/00
See application file for complete search history.

(56) References Cited

U.S. PATENT DOCUMENTS

| 7,068,294 | B2 | 6/2006 | Kidney et al. |
| 7,237,202 | B2 | 6/2007 | Gage |
| 7,350,011 | B2 | 3/2008 | Keely et al. |
| 7,515,937 | B2 | 4/2009 | Lee |
| 7,916,467 | B2 | 3/2011 | Hotelling et al. |
| 2001/0006375 | A1* | 7/2001 | Tomooka ............... G06F 3/1446 345/4 |
| 2005/0168399 | A1* | 8/2005 | Palmquist ............. G06F 1/1601 345/1.1 |
| 2006/0034042 | A1* | 2/2006 | Hisano .................. G06F 1/1616 361/679.04 |
| 2006/0077544 | A1* | 4/2006 | Stark ................... G02F 1/13336 359/448 |
| 2006/0111160 | A1 | 5/2006 | Lin et al. |
| 2007/0125949 | A1* | 6/2007 | Murata ..................... G01J 1/46 250/338.1 |

(Continued)

OTHER PUBLICATIONS

Wick, Ryan, et al., "Controlling Image Displays of Wireless Devices," filed Jan. 27, 2011, U.S. Appl. No. 13/015,158.

(Continued)

*Primary Examiner* — Sejoon Ahn

(57) ABSTRACT

A mobile communication device promoting an extendable display. The mobile communication device comprises a software application stored in a memory of the electronic device, when executed by a processor of the electronic device in response to detecting the second proximate display screen, communicates with the second display screen and ad hoc collaborates with the second display screen. The software application further adapts a graphic to display it on the first display screen and the second display screen, with one part of the graphic displayed on the first display screen and the rest of the graphic displayed on the second display screen, without displaying an opaque bar at an edge where display screens touch, wherein the graphic is scaled based on a size of the combined single display screen.

20 Claims, 11 Drawing Sheets

(56) References Cited

U.S. PATENT DOCUMENTS

| | | | | |
|---|---|---|---|---|
| 2007/0273609 A1* | 11/2007 | Yamaguchi | G06F 3/1423 | 345/1.1 |
| 2008/0167095 A1 | 7/2008 | Kim et al. | | |
| 2008/0216125 A1* | 9/2008 | Li | H04N 13/0239 | 725/62 |
| 2008/0231546 A1* | 9/2008 | Li | G06F 3/1423 | 345/3.4 |
| 2009/0201222 A1 | 8/2009 | Damian | | |
| 2009/0309819 A1* | 12/2009 | Elliott | G06F 3/1446 | 345/82 |
| 2009/0318185 A1 | 12/2009 | Lee | | |
| 2010/0053164 A1 | 3/2010 | Imai et al. | | |
| 2010/0058205 A1* | 3/2010 | Vakil | G06F 1/1616 | 715/761 |
| 2010/0144283 A1* | 6/2010 | Curcio | G06F 1/1626 | 455/66.1 |
| 2010/0277665 A1* | 11/2010 | Kuo | G02F 1/13336 | 349/58 |
| 2010/0290124 A1* | 11/2010 | Tohara | G02B 27/0172 | 359/630 |
| 2010/0321275 A1* | 12/2010 | Hinckley | G06F 1/1618 | 345/1.3 |
| 2011/0050544 A1* | 3/2011 | Tomono | G06F 3/1446 | 345/1.3 |
| 2011/0136541 A1 | 6/2011 | Chang et al. | | |
| 2011/0285607 A1* | 11/2011 | Kim | H05K 7/16 | 345/1.3 |
| 2012/0050314 A1* | 3/2012 | Wang | G06F 3/1446 | 345/619 |
| 2012/0062442 A1* | 3/2012 | Locker | G06F 3/1446 | 345/1.3 |
| 2012/0088548 A1* | 4/2012 | Yun | G08C 17/02 | 455/557 |
| 2012/0127061 A1* | 5/2012 | Pegg | H04M 1/0247 | 345/1.1 |
| 2012/0224311 A1 | 9/2012 | Sutherland et al. | | |
| 2013/0162504 A1* | 6/2013 | Kawano | G06F 3/1446 | 345/1.3 |
| 2013/0201109 A1* | 8/2013 | Knighton | G06F 1/1666 | 345/169 |
| 2013/0202339 A1* | 8/2013 | Knighton | G06F 3/0202 | 400/489 |
| 2013/0214995 A1* | 8/2013 | Lewin | G06F 3/1446 | 345/1.3 |
| 2013/0222410 A1* | 8/2013 | Kameyama | H04N 13/044 | 345/589 |
| 2014/0049911 A1* | 2/2014 | Corbin | A45C 13/002 | 361/679.58 |
| 2014/0168277 A1* | 6/2014 | Ashley | G06F 3/1446 | 345/672 |
| 2014/0194066 A1* | 7/2014 | Li | G06F 3/1446 | 455/41.3 |
| 2014/0247548 A1* | 9/2014 | Sharma | G06F 1/1626 | 361/679.27 |
| 2014/0253417 A1* | 9/2014 | Brown | G06F 3/1446 | 345/2.3 |
| 2014/0302773 A1* | 10/2014 | Jantunen | H04W 8/005 | 455/3.01 |
| 2014/0320912 A1* | 10/2014 | Kubo | G06F 3/1423 | 358/1.15 |
| 2015/0002371 A1* | 1/2015 | Burgess | G09G 5/12 | 345/1.2 |
| 2015/0077365 A1* | 3/2015 | Sasaki | G06F 3/1446 | 345/173 |
| 2015/0091778 A1* | 4/2015 | Day | G06F 3/1446 | 345/1.3 |
| 2015/0097755 A1* | 4/2015 | Kim | G06F 3/1446 | 345/1.3 |
| 2015/0220299 A1* | 8/2015 | Kim | G06F 1/1605 | 345/1.3 |
| 2015/0355791 A1* | 12/2015 | Hidaka | G06F 3/1454 | 715/761 |
| 2016/0034240 A1* | 2/2016 | Kreiner | G06F 3/1446 | 348/383 |

OTHER PUBLICATIONS

Office Action dated Jun. 14, 2013, U.S. Appl. No. 13/015,158, filed Jan. 27, 2011.

Final Office Action dated Oct. 9, 2013, U.S. Appl. No. 13/015,158, filed Jan. 27, 2011.

Advisory Action dated Dec. 26, 2013, U.S. Appl. No. 13/015,158, filed Jan. 27, 2011.

Office Action dated Jun. 18, 2014, U.S. Appl. No. 13/015,158, filed Jan. 27, 2011.

Final Office Action dated Dec. 5, 2014, U.S. Appl. No. 13/015,158, filed Jan. 27, 2011.

* cited by examiner

EXTENDABLE DISPLAY SCREENS OF ELECTRONIC DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Content can be displayed on various devices including televisions and computer monitors, which are generally fixed in position relative to a viewer. The content is generally received from a content source in a format compatible with a display screen and displayed on the screen for a viewer. Various types of content can be displayed, for example, by changing a channel or an input source (e.g., selecting a DVD player, video game, etc.). For example, a cable or set top box may be used to deliver content to a customer that can be displayed on a television set.

SUMMARY

In an embodiment, a mobile communication device with an extendable display screen is disclosed. The mobile communication device comprises a first display screen displaying a graphic and opaque bar along an outer edge of the graphic, at least one display screen proximity sensor to detect a second display screen, and at least one alignment point to promote alignment with a detected second display screen to form a single display screen. The mobile communication device further comprises a software application stored in a memory of the electronic device, when executed by a processor of the electronic device in response to detecting the second proximate display screen, communicates with the second display screen and ad hoc collaborates with the second display screen. The software application further adapts a graphic to display it on the first display screen and the second display screen, with one part of the graphic displayed on the first display screen and the rest of the graphic displayed on the second display screen, without displaying an opaque bar at an edge where display screens touch, wherein the graphic is scaled based on a size of the combined single display screen.

In an embodiment, an electronic device promoting an extendable display is disclosed. The electronic device comprises a first display screen displaying a graphic image and an opaque bar along an outer edge of the graphic image, at least one display screen proximity sensor to detect a second display screen, and at least one alignment point to promote alignment with a detected second display screen to form a display screen. The electronic device further comprises at least one auto-leveling component to auto-level the first display screen against the second display screen to form a single even display surface, and a software application. The software application stored in a memory of the electronic device, when executed by a processor of the electronic device in response to detecting the second proximate display screen, communicates with the second display screen and ad hoc collaborates with the second display screen. The software application further adapts a graphic image to display it on the first display screen and the second display screen, with one part of the graphic image displayed on the first display screen and the rest of the graphic image displayed on the second display screen, without displaying an opaque bar at an edge where display screens touch, wherein the graphic image is scaled based on a size of the combined single display screen.

In an embodiment, an electronic device promoting an extendable display is disclosed. The electronic device comprises a first display screen displaying a graphic and an opaque bar along an outer edge of the graphic, at least one display screen proximity sensor to detect a second display screen, and at least one alignment point to promote alignment with a detected second display screen to form a single display screen. The electronic device further comprises a software application stored in a memory of the electronic device, when executed by a processor of the electronic device in response to detecting the second proximate display screen, communicates with the second display screen and ad hoc collaborates with the second display screen. The software application further adapts a graphic to display it on the first display screen and the second display screen, with one part of the graphic displayed on the first display screen and the rest of the graphic displayed on the second display screen, without displaying an opaque bar at an edge where display screens touch. The software application further stretches one part of the graphic displayed on one of the two display screens based on a detected relative angle of eyes of a viewer if the two display screens are not leveled, whereby display alignment is adapted based on display screen alignment.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
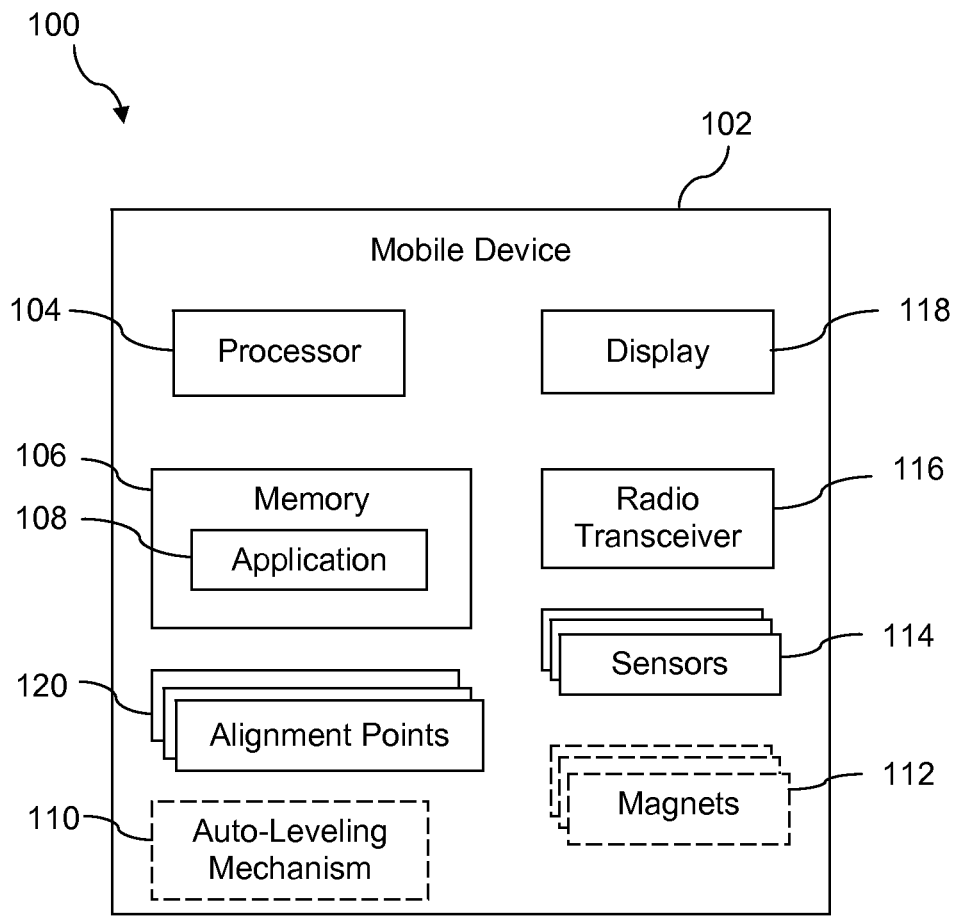
FIG. 1A is an illustration of a mobile communication device according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A mobile communication device with a small display screen is convenient to carry. However, big display screens may be desirable in some circumstances. For example, when waiting at an airport, one may desire a bigger display screen than a display screen of a mobile phone. The present disclosure teaches a system and method for aligning small display screens to form a big display screen.

For example, a first display screen of an electronic device may display a graphic and an opaque bar along the outer edge of the graphic. The display screen may be equipped with mechanism(s) for detecting and/or aligning with a proximate display screen. The detected proximate display screen may be equipped with similar mechanism(s) for detecting and/or aligning with the display screen. In an embodiment, the display screen may comprise at least one proximity sensor, for example an infrared sensor, a magnetic sensor, a radio receiver, or another type of proximity sensor, to detect proximate display screens. The proximate display screens that may be detected by a proximity sensor may have the same display technology as the first display screen. When a proximate screen display, a second display screen, is detected, alignment point(s) along the edge(s) of the first display screen may promote alignment with the detected second display screen. One or more auto-leveling component of the first display screen may auto-level the first display screen against the second display screen to form an even display surface. The two display screens may be said to form a single display screen. It is understood that promoting alignment between two or more display screens may comprise providing or presenting information that assists a user to better align the displays, for example presenting arrows on a display of one or both screens to move one device relative to the other.

For example, a proximity sensor may be an infrared sensor, a magnetic sensor, a radio receiver, or another type of proximity sensor. A magnet may be used as an alignment point component. An infrared reader on the first display screen may detect the second display screen with an infrared sensor. A first magnet on the first display screen may align with the second display screen with a second magnet when polarities of the two magnets match. Alternatively, a set of infrared readers on the first display screen may detect the second display screen with a set of infrared sensors. A first set of magnets along an edge of the first display screen may align with the second display screen with whose edge a second set of magnets are located along when polarities of the two sets of magnets match. Automatic screws may be installed, for example at corners of a display screen or elsewhere on the display screen, to auto-level the screen display. For example, in response to circumstance changing, for example a change in an electrical field, a change in a magnetic field, a change in a radio frequency field, or another type of circumstance change, automatic screws may screw in or screw out to raise or lower their heights. The height of a display screen may be changed this way to level with another display screen.

The alignment points may allow the first display screen to align with the second display screen in different orientations. For example, a long side of the first display screen may align with a long side of the second display screen. Alternatively, a short side of the first display screen may align with a long side of the second display screen. With the auto-leveling components, the first display screen may tilt to a side to level with the second display screen instead of raising or lowering the height of the whole display screen. In an embodiment, the alignment points may mechanically promote alignment of two or more display screens with each other. For example, different sized protrusions on a first device may mate only in one aligned state with corresponding different sized apertures or inclusions on a second device.

Alignment points may be locations along the sides of an electronic device that promote determining position along that side. Detection procedures and processes may be functions or analysis logic that responsive to the inputs, passive or active, of the alignments points to determine or allow the determining of the alignment, for example to determine that alignment has been achieved or has not been achieved. In an embodiment, the detection may promote determining how much the electronic devices are short or lacking alignment and in what sense the alignment is lacking, whereby to cue a user what alignment adjustments to complete.

A software application may be stored in a memory of the electronic device. When executed by a processor of the electronic device, the application may perform a variety of functionality to collaborate with the second display screen. For example, the application may communicate with the second display screen in response to detecting the second display screen. For example, the application may communicate with the second display screen through a wireless network, for example WiFi. Alternatively, the application may communicate with the second display screen through a short-range wireless technology or an on-contact network, for example through near field communication (NFC) or radio-frequency identification (RFID) technology. Information such as heights of the two display screens, where the two display screens touch, or other information may be exchanged. The information on where the two display screens touch may be transmitted from the alignment point(s) and then transmitted to the other display screen.

The application may collaborate with the second display screen in an ad hoc manner. For example, the application on the electronic device may communicate with a second application on the second display screen for handshaking purposes, for example to set up a wireless communication link between the electronic device and the second display screen, to discover capabilities, to promote alignment, or for another purpose. The application and the second application may communicate with each other to share content, for example content of a graphic to be displayed on both the first display screen and the second display screen. Additionally, the application and the second application may collaborate to establish a leadership relation, for example with one of the two display screens as a leader in the relation. The leader may control the collaboration between the two display screens.

The application may adapt a graphic to display it on the first display screen and the second display screen. One part of the graphic may be displayed by the application on the first display screen, and the rest of the graphic may be displayed on the second display screen. No opaque bar may be displayed by the application at the edge where the two display screens touch. The graphic may be scaled by the application to fit the newly formed display screen of a size approximately a summation of the size of the first display screen and the size of the second display screen. Additionally, when the two display screens are not leveled, for example when the auto-leveling component(s) is broken, one part of the graphic displayed on one of the two display screens may be algorithmically stretched by the application based on a detected relative angle of eyes of a viewer to display as a continuous and undistorted graphic to the viewer as if the two display screens are leveled. Alternatively, one part of the graphic on one display screen may be distorted based on a detected relative angle of eyes of a viewer to align with the rest of the graphic on the other display screen to show a continuous and undistorted graphic to the viewer as if the two display screens are leveled.

When the two display screens are misaligned, an image may be adapted to fit the area where the two display screens align. For example, an image may be displayed within an area where the two display screens are aligned. When the maximum display resolution of one display screen is lower than the maximum display resolution of the other display screen, the display screen with the higher maximum display resolution may adapt the lower maximum display resolution of the other display screen, and the graphic may be displayed with the lower maximum display resolution on the two display screens.

The first display screen or the second display screen may further detect a third display screen and align with the third display screen. Similar to the way how the first display screen collaborates with the second display screen, the first display screen may also collaborate with the third display screen while collaborating with the second display screen. The three display screens may be said to form a single display screen. A first part of a graphic may be displayed on the first display screen, a second part of the graphic on the second display screen, and the rest of the graphic on the third display screen. No opaque bar may be displayed at edges where the display screens touch. The graphic may be scaled based on the size of the single display screen formed by the three display screens. The application on each display screen may communicate and/or collaborate to accomplish the above tasks.

In an embodiment, the display screen may project to the side of the display a part of a graphic while displaying the rest of the graphic on the display screen. Or, when placed down on an object, for example a table, a projector may project a graphic to both the display screen and the surface of the object. One part of the graphic may be displayed on the display screen, and the rest of the graphic may be displayed on the surface of the object. Alternatively, the surface of the table may be turned into a display screen when another display screen is placed on top of the table surface. A part of the graphic may be displayed on the display screen, and the rest of the graphic may be displayed on the table surface.

Turning now to FIG. 1A, a mobile communication device 102 is described. In an embodiment, the mobile device 102 may comprise a processor 104, a display 118, a memory 106, a radio transceiver 116, at least one alignment point 120, and at least one display screen proximity sensor 114. The mobile communication device 102 may also comprise an auto-leveling mechanism 110 and/or at least one magnet 112 in other embodiments. The memory 106 may comprise an application 108. The mobile device 102 may be configured to use the radio transceiver 116 to establish a wireless communication link with a base transceiver station (BTS), and the base transceiver station may provide communications connectivity of the device 102 to a network. The collectivity of base transceiver stations may be said to comprise a radio access network, in that these base transceiver stations may provide a radio communication link to the mobile devices 102 to provide access to the network. The network may comprise any combination of private and public networks.

The radio transceiver 116 of the mobile communication device 102 may communicate with the base transceiver station using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The mobile device 102 may be any of a mobile phone, a personal digital assistant (PDA), a media player, a laptop computer, a tablet computer, a notebook computer, a wearable computer, a headset computer, or another network/communications capable device. In an embodiment, the mobile communication device 102 may have other components (not shown) such as a near field communication (NFC) radio transceiver, a short range radio transceiver such as a wireless local area network (WLAN) radio transceiver, or other components.

In an embodiment, the mobile communication device 102 may comprise at least one display screen proximity sensor 114. The proximity sensor(s) 114 may be located along an outer edge of the mobile communication device 102 or the display screen 118. A proximity sensor 114 may be an infrared sensor, a magnetic sensor, a radio receiver, or another type of proximity sensor. The proximity sensor 114 may detect another display screen, for example by detecting proximity sensor(s) 114 of the other display screen. The detected display screen, also referred to as the second display screen herein, may have a same display technology as the display screen 118 of the mobile communication device 102. For example, infrared sensor(s) may be installed along the outer edge of the mobile communication device 102 to detect another display screen, for example with infrared reader(s). A second mobile communication device may have a substantially similar structure as the mobile communication device 102. Note that the mobile communication device 102 may be equipped with mechanism(s) for detecting and/or aligning with a proximate display screen other than using proximity sensor(s) 114 and alignment point(s) 120 as shown in FIG. 1. The detected proximate display screen may be equipped with similar mechanism(s) for detecting and/or aligning with the display screen.

The alignment points 120 may be located along the outer edge of the mobile communication device 102 or the display screen 118. The alignment point(s) 120 may promote alignment of the first display screen 118 with the second display screen. The two display screens may align to form a single display screen. For example, magnet(s) 112 may be installed on an outer edge of the display screen 118 as a proximity sensor 114 and an alignment point 120. The magnet(s) 112 may detect other magnet(s) 112 from another display screen and may align with the detected magnet(s) 112 if their magnetic polarities allow. The alignment point(s) 120 may allow the first display screen 118 to align with the second display screen in different orientations. For example, a long side of the first display screen 118 may align with a long side of the second display screen. A short side of the first display screen 118 may align with a long side of the second display screen. Alternatively, a long side of the first display screen 118 may align with a short side of the second display screen.

In an embodiment, the mobile communication device 102 may comprise an auto-leveling mechanism 110. Component(s) of the auto-leveling mechanism 110 may be located along the outer edge of the mobile communication device 102 or the display screen 118. For example, the component(s) of the auto-leveling mechanism 110 may be located at corner(s) of the mobile communication device 102 or the display screen 118. The auto-leveling mechanism 110 may auto-level the display screen 118 against the detected display screen to form an even display screen surface so that the two display screens may perform as a single display screen. For example, automatic screws may be installed at corners of the display screen 118. In response to circumstances changing, for example a change in an electrical field, a change in a magnetic field, a change in a radio frequency field, or another type of circumstance change, the automatic screws may raise or lower their heights to change the height of the display screen 118 to level with the detected display screen. The formed single display screen may be of a size approximately a summation of the size of the first display screen and the size of the second display screen. With the auto-leveling mechanism 110, the first display screen 118 may tilt to a side to level with the second display screen.

The application 108 may be stored in the memory 106 of the mobile communication device 102. When executed by the processor 104 of the mobile communication device 102, the application 108 may perform a variety of functionality to collaborate with the detected display screen(s). For example, the application 108 may communicate with the detected display screen. Additionally, the application 108 may adapt a graphic to display it on the display screen 118 and the detected display screen.

For example, the application 108 may communicate with a second display screen in response to detecting the second display screen. For example, the application 108 may communicate with the second display screen through a wireless network, for example WiFi. Alternatively, the application 108 may communicate with the second display screen through a short-range wireless technology or an on-contact network, for example through near field communication (NFC) or radio-frequency identification (RFID) technology.

Information such as heights of the two display screens, where the two display screens touch, or other information may be exchanged between the two display screens. The information on where the two display screens touch may be transmitted from the alignment point(s) 120 and may be then transmitted to the other display screen. The application 108 may transmit commands to the second display screen for collaboration, for example to another application or a similar application on the second display screen. Data on a part of a graphic that the second display screen may display may also be transmitted to the second display screen by the application 108.

The application 108 may collaborate with the second display screen in an ad hoc manner. For example, the application 108 may communicate with a second application on the second display screen for handshaking purposes, for example to set up a wireless communication link between the mobile communication device 102 and the second display screen, to discover capabilities, to promote alignment, or for another purpose. The application 108 and the second application may communicate with each other to share content, for example content of a graphic to be displayed on both the first display screen 118 and the second display screen. Additionally, the application 108 and the second application may collaborate to establish a leadership relation, for example with one of the two display screens as a leader in the relation. The leader may control the collaboration between the two display screens.

The application 108 may adapt a graphic to display it on the first display screen 118 and the second display screen. For example, one part of the graphic may be displayed by the application 108 on the first display screen 118, and the rest of the graphic may be displayed by the application 108 on the second display screen. No opaque bar may be displayed by the application 108 at the edge where the two display screens touch. The graphic may be scaled by the application 108 to fit the formed display screen. Additionally, when the two display screens are not leveled, for example when the auto-leveling mechanism 110 is not working properly, action may be taken by the application 108 to display the graphic as continuous and undistorted as if the two display screens are leveled. For example, one part of the graphic which is displayed on one of the two display screens may be algorithmically stretched by the application 108 based on a detected relative angle of eyes of a viewer to display to the viewer a continuous and undistorted graphic as if the two display screens are leveled. Alternatively, one part of the graphic on one display screen may be distorted based on a detected relative angle of eyes of a viewer to align with the rest of the graphic on the other display screen to show a continuous and undistorted graphic to the viewer as if the two display screens are leveled.

When the two display screens are misaligned, an image may be adapted to fit the area where the two display screens align. For example, when two display screens of different sizes align to form a single display screen, they may not appropriately align. Alternatively, the alignment points on the first display screen align with wrong alignment points on the second display screen. For example, as discussed earlier, the second mobile communication device may have a substantially similar structure as the mobile communication device 102. Thus the second display screen may have alignment points located at the same locations as alignment points of the first display screen 118. However, when the two display screens align, the alignment points of the first display screen 118 may not align with corresponding alignment points of the second display screen, for example the two display screens may align with one alignment point off.

An image may be displayed within an area where the two display screens are aligned. A graphical frame may be aligned across the display screen edges, for example by the application 108. When the maximum display resolution of one display screen is lower than the maximum display resolution of the other display screen, the display screen with the higher maximum display resolution may adapt the lower maximum display resolution of the other display screen, and the graphic may be displayed with the lower maximum display resolution on the two display screens. For example, if the maximum display resolution of the first display screen 118 is 2880 times 1800 and the maximum display resolution of the second display screen is 2880 times 900, the graphic may be displayed with the lower display resolution of the two maximum display resolutions, 2880 times 900. The size of the graphic may also be adapted to fit the formed display screen. For example, the size of the graphic displayed on the formed display screen may be 1.5 times the size of the graphic if the graphic would have been displayed on the first display screen 118.

Figure 1B:
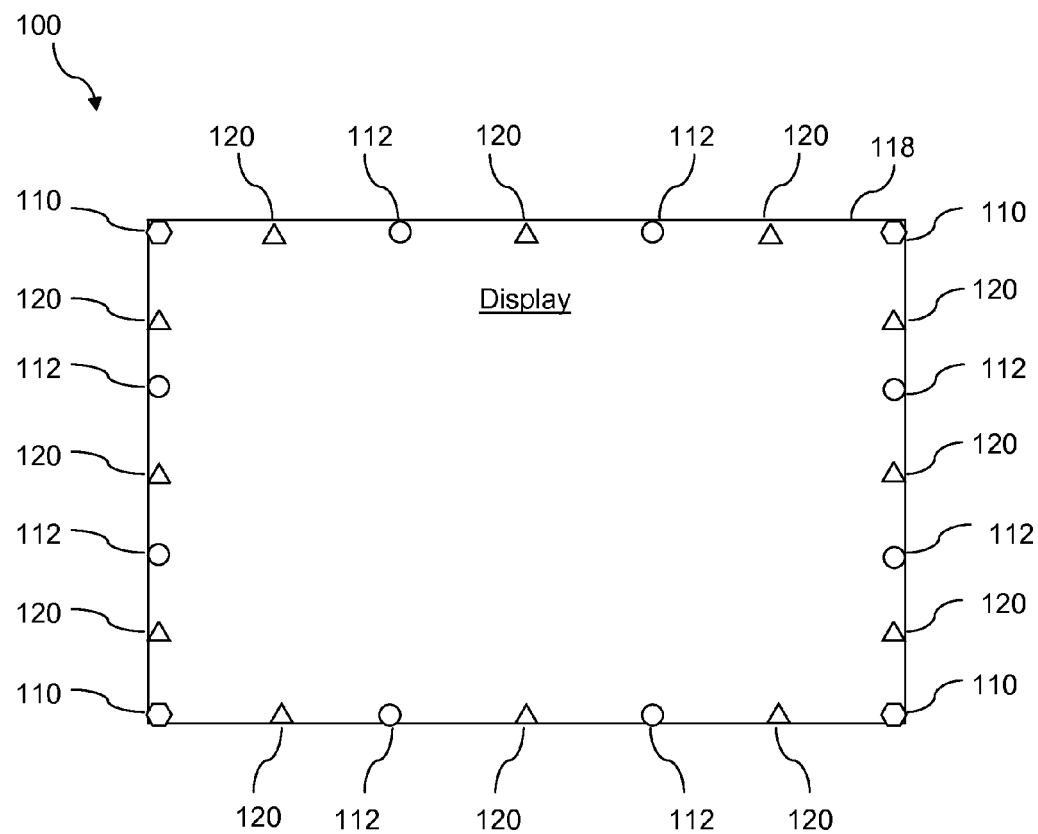
FIG. 1B is an illustration of physical layout of a display screen of a mobile communication device according to an embodiment of the disclosure.

Turning now to FIG. 1B, a physical layout of a display screen 118 is described. In an embodiment, the display screen 118 may comprise auto-leveling component(s) 110 and/or proximity sensor(s) 112. The auto-leveling components 110 may be located at the four corners of the display screen 118 or elsewhere on the display screen 118. The proximity sensors 112 may be located along the outer edge of the display screen 118 or elsewhere on the display screen 118. The alignment points 120 may be located along the outer edge of the display screen 118 or elsewhere on the display screen 118. It is noted that although four auto-leveling components 110 are shown in FIG. 1B, the display screen 118 may comprise another number of auto-leveling components 110, for example 2, 6, 8, or another number. An auto-leveling component 110 may be a screw, a cam arm, or another type of auto-leveling component 110. It is noted that although eight proximity sensors 112 are shown in FIG. 1B, the display screen 118 may comprise another number of proximity sensors 112, for example 4, 6, 10, or another number. It is noted that although 12 alignment points 120 are shown in FIG. 1B, the display screen 118 may comprise another number of alignment points 120, for example 4, 8, 10, or another number.

A hexagon is used in FIG. 1B to represent a possible location of an auto-leveling component 110, a circle is used to represent a possible location of a proximity sensor 112, and a triangle is used to represent a possible location of an alignment point 120. However, the hexagon, circle, and triangle may not represent the physical shape of an actual auto-leveling component 110, a proximity sensor 112, or an alignment point 120.

Figure 2:
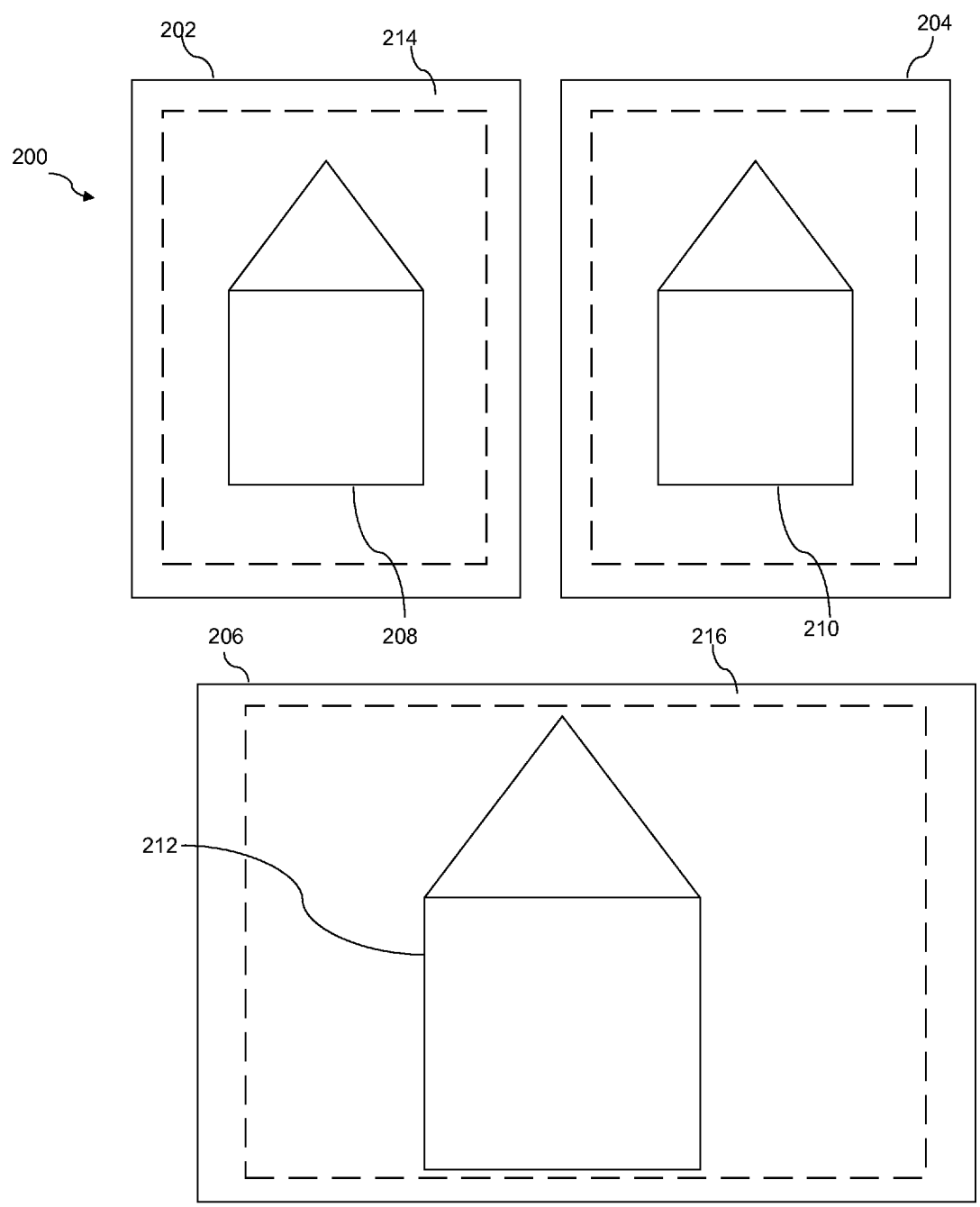
FIG. 2 is an illustration of an alignment according to an embodiment of the disclosure.

Turning now to FIG. 2, a method 200 of aligning two display screens to one single display screen to show a graphic is described. The top half of FIG. 2 shows two display screens before they align to form a single display screen. The bottom half of FIG. 2 shows the single display screen formed by the two display screens aligned next to each other. In an embodiment, a first display screen 202 may display a first graphic 208 and an opaque bar 214 along the outer edge of the first graphic 208. A second display screen 204 may display a second graphic 210 and an opaque bar along the outer edge of the second graphic 210. The first display screen 202 and the second display screen 204 may be of the same size. The same graphic, the first graphic 208 and the second graphic 210, is shown in FIG. 2 for display and explanation purposes. When proximity sensors on the first display screen 202 detects the second display screen 204, alignment points on the first display screen 202 may align the first display screen 202 with the second display screen 204.

A single flat even display surface may be formed by the two display screens 202 and 204. This display screen may be referred to as a third display screen 206. A third graphic 212 may be displayed on the third display screen 206. The third graphic 212 may comprise the same content as the first graphic 208 and the second graphic 210. No opaque bar may be displayed along the edge where the two display screens 202 and 204 touch. An opaque bar 216 may be displayed along the outer edge of the third graphic 212. The graphic 212 may be scaled to fit the size of the third display screen 206, as shown in FIG. 2.

Figure 3:
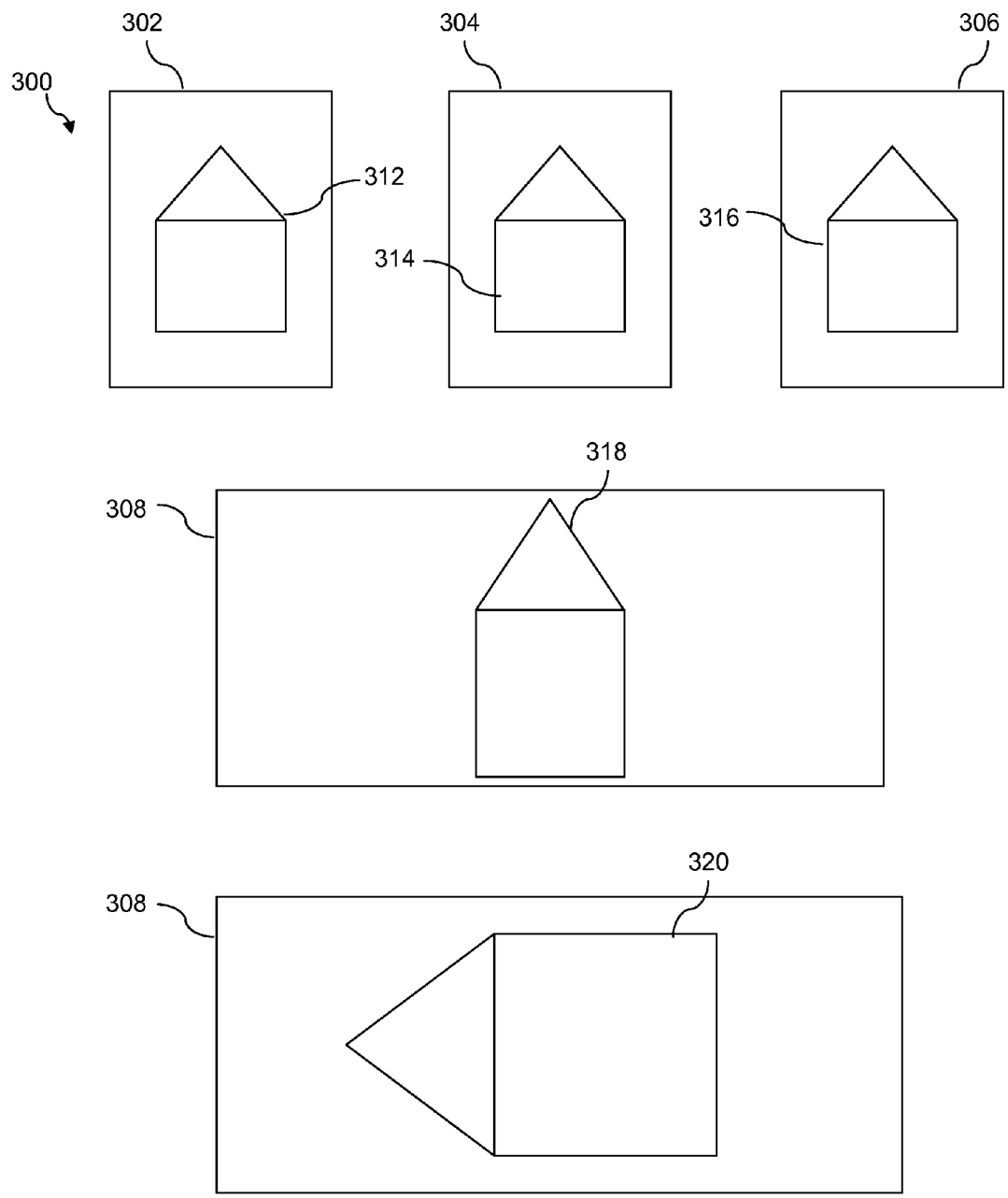
FIG. 3 is an illustration of a second alignment according to an embodiment of the disclosure.

FIG. 3 depicts a method 300 of combining three display screens into one single display screen and two ways of showing a graphic on the formed display screen. A first display screen 302 may detect a second display screen 304 and align with the second display screen 304. The second display screen 304 may detect a third display screen 306 and align with the third display screen 306. A single display screen 308 may be formed by aligning the three display screens 302-306. The formed display screen 308 may be referred to as a fourth display screen.

In an embodiment, the first display screen 302, the second display screen 304, and the third display screen 306 may display a first graphic 312, a second graphic 314, and a third graphic 316 respectively before they align to form a single display screen 308. A same graphic is used for graphics 312-316 for display and explanation purposes. When the short sides of the three display screens 302-306 align to form the display screen 308, the graphic 312-316 may be displayed in two ways. A fourth graphic 318 may be displayed in the same relative direction as how the graphics 312-316 are displayed relative to the long side and short side of each of the three display screens 302-306. Alternatively, a fifth graphic 320 may be displayed on the display screen 308 rotated 180 degrees from the graphic 318 to fit the display screen 308 better. The graphics 318/320 may be scaled to fit the display screen 308.

Figure 4:
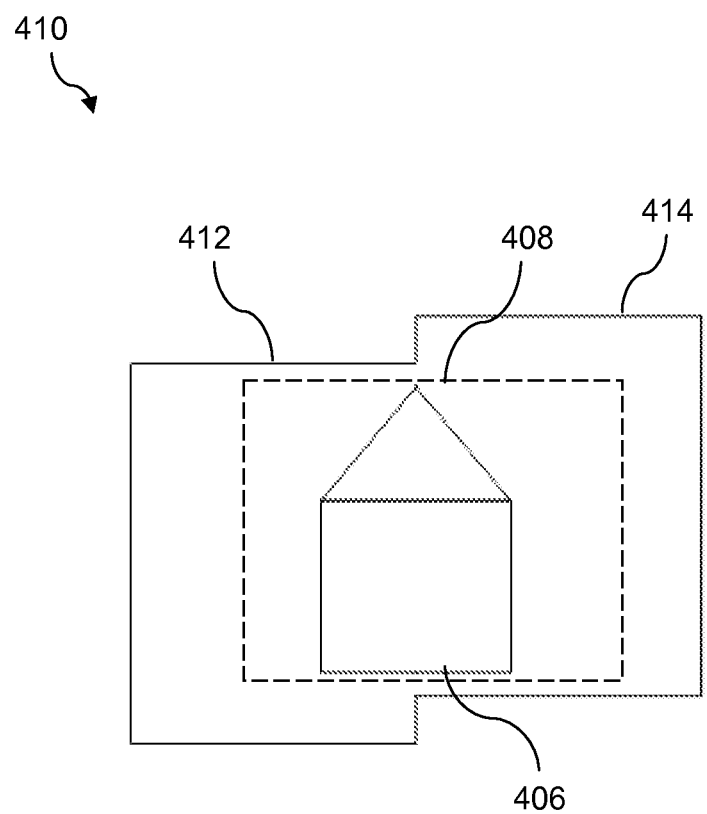
FIG. 4 is an illustration of a third alignment according to an embodiment of the disclosure.

FIG. 4 shows a method 410 of showing a graphic on two misaligned display screens. In an embodiment, when two display screens 412/414 align to form a single display screen, the two display screens 412/414 may not appropriately align. A graphic 406 may be displayed in a shared portion 408 where the two display screens 412 and 414 are aligned. For example, the applications 108 on the two display screens 412 and 414 may detect and/or measure the amount of alignment off-set of the two display screens 412 and 414. One of the applications 108 on the two display screens 412 and 414 may be determined to be a leader in their collaboration and may determine how to off-set the graphic 406 to realize alignment of the two display screens 412 and 414.

Figure 5:
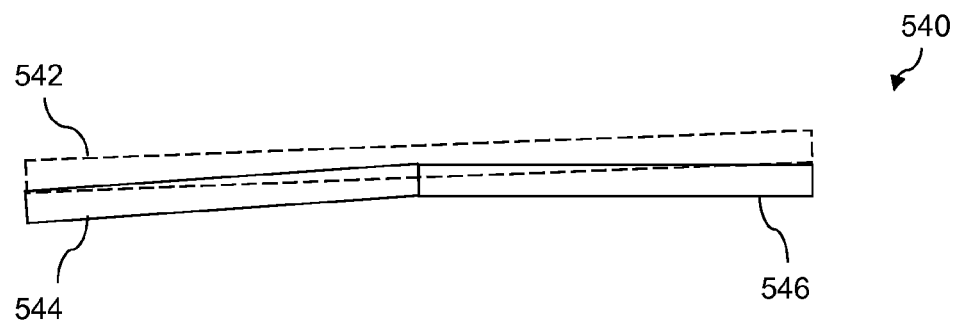
FIG. 5 is an illustration of a fourth alignment according to an embodiment of the disclosure.
Figure 5:
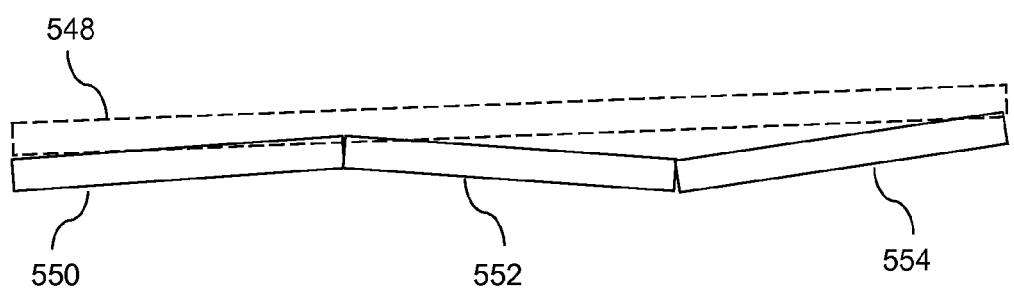

FIG. 5 illustrates a method 540 of displaying a graphic with unleveled display screens. In an embodiment, two display screens 544 and 546 may be unleveled when attempting to align to form a single display screen. Similarly, three display screens 550-554 may be unleveled when attempting to align to form a single display screen. When display screens attempting to align to form a single display screen are unleveled, for example when the auto-leveling component is broken or unable to compensate fully, action may be taken to display the graphic as continuous and undistorted as if the display screens are leveled. For example, one part of the graphic which is displayed on one of the display screens may be algorithmically stretched by an application 108 of the two display screens 544 and 546 based on a detected relative angle of eyes of a viewer to display as a continuous and undistorted graphic to the viewer as if the display screens are leveled. Alternatively, one part of the graphic on one display screen may be distorted by the application 108 based on a detected relative angle of eyes of a viewer to align with the rest of the graphic on the other display screen(s) to show a continuous and undistorted graphic to the viewer as if the two display screens are leveled. The graphic shown to the viewer may be shown like a graphic displayed by a flat even display screen 542/548.

Figure 6:
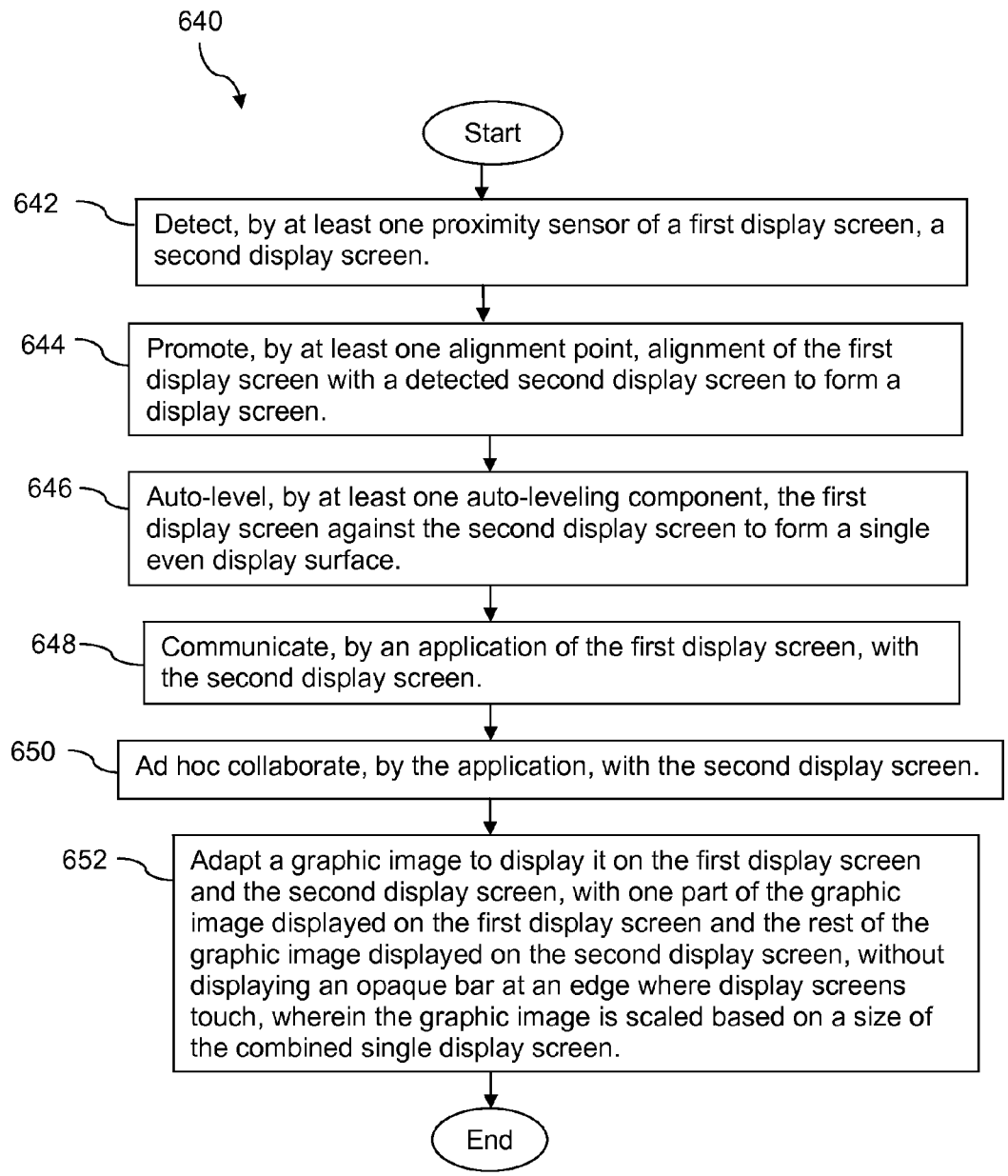
FIG. 6 is a flow chart illustrating another method according to an embodiment of the disclosure.

Turning now to FIG. 6, a method 640 is described. At block 642, a second display screen is detected by at least one proximity sensor of a first display screen. For example, a second display screen may be detected by proximity sensor(s) 114 of the display screen 118. At block 644, alignment of the first display screen with a detected second display screen is promoted by at least one alignment point to form a display screen. For example, alignment of the display screen 118 with the detected second display screen may be promoted by the at least one alignment point 120 to form a single display screen.

At block 646, the first display screen is auto-leveled by at least one auto-leveling component against the second display screen to form a single even display surface. For example, the display screen 118 may be auto-leveled by at least one auto-leveling component of the auto-leveling mechanism 110 against the second display screen to form a single even display surface. At block 648, an application of the first display screen communicates with the second display screen. For example, the application 108 on the display screen 118 may communicate with the second display screen. At block 650, the application ad hoc collaborates with the second display screen. In an embodiment, the application 108 may collaborate with the second display screen in an ad hoc manner.

At block 652, a graphic image is adapted to be displayed on the first display screen and the second display screen, with one part of the graphic image displayed on the first display screen and the rest of the graphic image displayed on the second display screen, without displaying an opaque bar at an edge where display screens touch, wherein the graphic image is scaled based on a size of the combined single display screen. For example, a graphic may be adapted by the application 108 to be displayed on the display screen 118 and the second display screen. One part of the graphic may be displayed on the display screen 118, and the rest of the graphic may be displayed on the second display screen. No opaque bar may be displayed at an edge where the two display screens touch. The graphic may be scaled based on a size of the combined single display screen.

Figure 7:
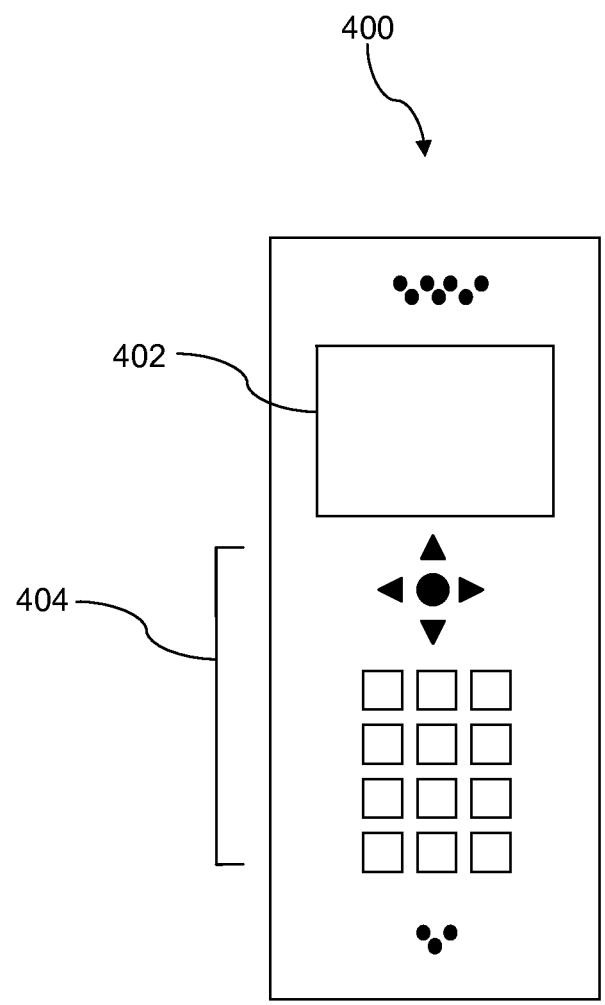
FIG. 7 is an illustration of a mobile communication device according to an embodiment of the disclosure.

FIG. 7 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 8:
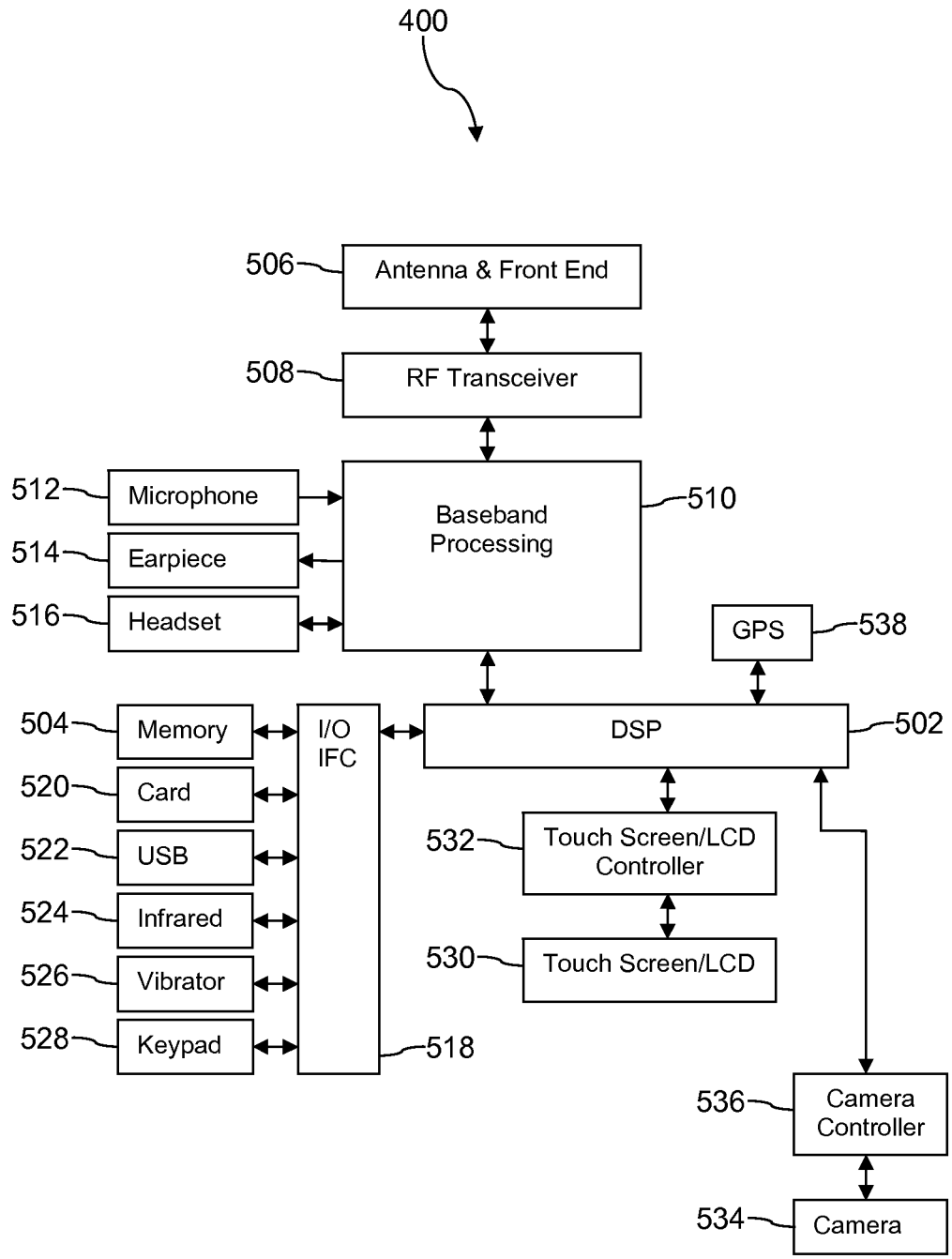
FIG. 8 is a block diagram of a mobile communication device according to an embodiment of the disclosure.

FIG. 8 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 9A:
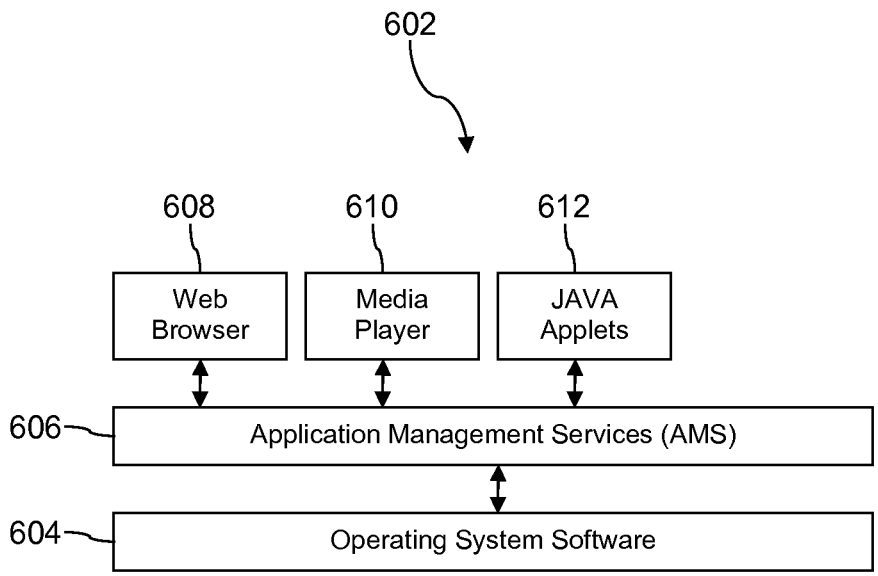
FIG. 9A is a block diagram of a software architecture of a mobile communication device according to an embodiment of the disclosure.

FIG. 9A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 9A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 9B:
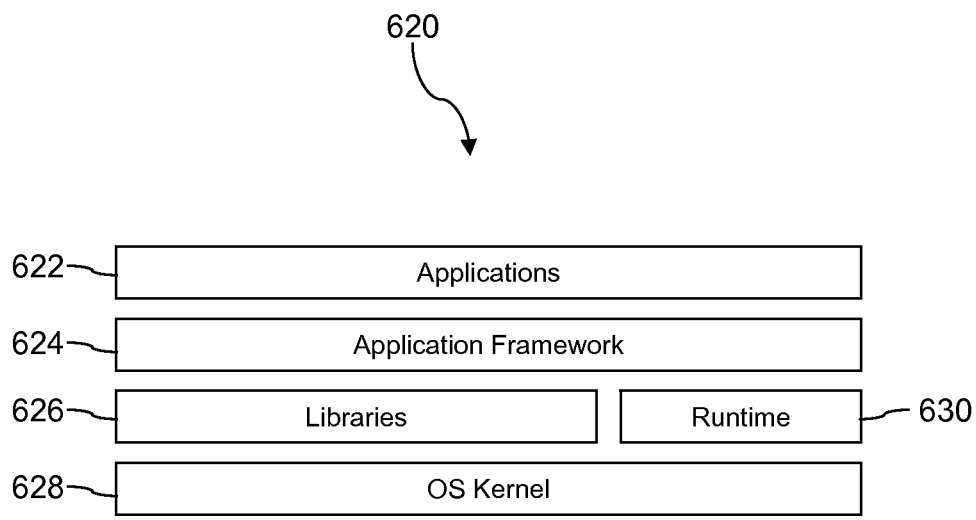
FIG. 9B is a block diagram of another software architecture of a mobile communication device according to an embodiment of the disclosure.

FIG. 9B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 10:
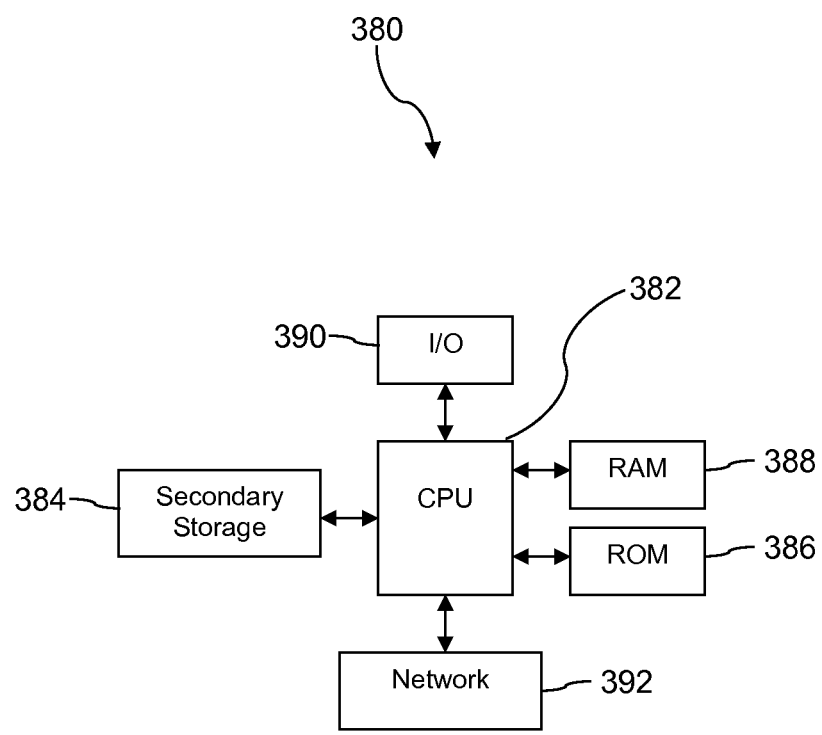
FIG. 10 is a block diagram of a computer system according to an embodiment of the disclosure.

FIG. 10 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device promoting an extendable display, comprising: a first display screen displaying a graphic and an opaque bar along an outer edge of the graphic; at least one display screen proximity sensor to detect a second display screen; a plurality of auto-leveling components, wherein at least one of the plurality of auto-leveling components is disposed in a corner of the first display screen, wherein the first display screen and the second display screen are different sizes, and wherein a height of the first display screen is changed via the plurality of auto-leveling components to level with the second display screen;
   at least one alignment point to promote alignment with a detected second display screen to form a single display screen; and
   a software application stored in a memory of the electronic device,
   when executed by a processor of the electronic device in response to detecting the second proximate display screen: communicates with the second display screen, ad hoc collaborates with the second display screen, and adapts a graphic to display it on the first display screen and the second display screen, with one part of the graphic displayed on the first display screen and the rest of the graphic displayed on the second display screen, without displaying an opaque bar at an edge where the first display screen and the second display screen touch, wherein the graphic is scaled based on a size of the combined single display screen, wherein, if at least one of the auto-leveling components does not work, one part of the graphic displayed on one of the two display screens is algorithmically stretched by the software application based on a detected relative angle of eyes of a viewer to display as a continuous and undistorted graphic to the viewer as if the two display screens are leveled.

2. The mobile communication device of claim 1, wherein the height of the first display screen is changed via the plurality of auto-leveling components to make the first display screen level with the second display screen in response to detecting an electrical field change, a magnetic field change, or a radio frequency field change.

3. The mobile communication device of claim 1, wherein the at least one alignment point allows the first display screen to align with the second display screen in different orientations.

4. The mobile communication device of claim 1, wherein the first display screen is tilted by the plurality of auto-leveling components to form a flat even display surface with the second display screen.

5. The mobile communication device of claim 1, wherein the software application communicates with the second display screen through a wireless communication link.

6. The mobile communication device of claim 1, wherein the software application communicates with the second display screen on contact.

7. The mobile communication device of claim 1, further comprising aligning with a third display screen in response to detecting the third display screen and collaborating with the second display screen and the third display screen to display one graphic on the three display screens, with a first part of the graphic displayed on the first display screen, a second part of the graphic displayed on the second display screen, and the rest of the graphic displayed on the third display screen, without displaying an opaque bar at edges where the first display screen, the second display screen, and the third display screen touch.

8. An electronic device promoting an extendable display, comprising: a first display screen displaying a graphic image and an opaque bar along an outer edge of the graphic image; at least one display screen proximity sensor to detect a second display screen; at least one alignment point to promote alignment with a detected second display screen to form a display screen;

at least one auto-leveling component disposed in a corner of the first display screen to auto-level the first display screen against the second display screen to form a single even display surface, wherein the first display screen and the second display screen are different sizes, and wherein a height of the first display screen is changed via the at least one auto-leveling component to level with the second display screen; and a software application stored in a memory of the electronic device, when executed by a processor of the electronic device in response to detecting the second proximate display screen: communicates with the second display screen, ad hoc collaborates with the second display screen, and adapts a graphic image to display it on the first display screen and the second display screen, with one part of the graphic image displayed on the first display screen and the rest of the graphic image displayed on the second display screen, without displaying an opaque bar at an edge where the first display screen and the second display screen touch, wherein the graphic image is scaled based on a size of the combined single display screen, wherein, if at least one of the auto-leveling components does not work, one part of the graphic displayed on one of the two display screens is algorithmically stretched by the software application based on a detected relative angle of eyes of a viewer to display as a continuous and undistorted graphic to the viewer as if the two display screens are leveled.

9. The electronic device of claim 8, wherein a graphic is adapted to be displayed in a shared portion where the two display screens touch when the two display screens are misaligned.

10. The electronic device of claim 8, wherein a lower maximum display resolution of the two display screens is adapted by the display screen with the higher maximum display resolution.

11. The electronic device of claim 8, wherein the second display screen and the first display screen share a same display technology.

12. The electronic device of claim 8, wherein a magnetic is used as a display screen proximity sensor and alignment point.

13. The electronic device of claim 8, wherein data is exchanged between the two display screens on their heights.

14. The electronic device of claim 8, wherein when the two display screens are not leveled, one part of the graphic on one display screen is distorted by the software application based on a detected relative angle of eyes of a viewer to align with the rest of the graphic on the other display screen.

15. An electronic device promoting an extendable display, comprising: a first display screen displaying a graphic and an opaque bar along an outer edge of the graphic; at least one display screen proximity sensor to detect a second display screen; a plurality of auto-leveling components, wherein at least one of the plurality of auto-leveling components is disposed in a corner of the first display screen, wherein the first display screen and the second display screen are different sizes, and wherein a height of the first display screen is changed via the plurality of auto-leveling components to level with the second display screen;

at least one alignment point to promote alignment with a detected second display screen to form a single display screen; and a software application stored in a memory of the electronic device, when executed by a processor of the electronic device in response to detecting the second proximate display screen: communicates with the second display screen, ad hoc collaborates with the second display screen, adapts a graphic to display it on the first display screen and the second display screen, with one part of the graphic displayed on the first display screen and the rest of the graphic displayed on the second display screen, without displaying an opaque bar at an edge where the first display screen and the second display screen touch, and stretches one part of the graphic displayed on one of the two display screens based on a detected relative angle of eyes of a viewer if the two display screens are not leveled; whereby display alignment is adapted based on display screen alignment, wherein, if at least one of the auto-leveling components does not work, one part of the graphic displayed on one of the two display screens is algorithmically stretched by the software application based on a detected relative angle of eyes of a viewer to display as a continuous and undistorted graphic to the viewer as if the two display screens are leveled.

16. The electronic device of claim 15, wherein the at least one alignment point allows the first display screen to align with the second display screen in different orientations.

17. The electronic device of claim 15, wherein the at least one alignment point transmits information to the software application on where the two display screens touch.

18. The electronic device of claim 15, further comprising aligning with a third display screen in response to detecting the third display screen and collaborating with the second display screen and the third display screen to display one graphic on the three display screens, with a first part of the graphic displayed on the first display screen, a second part of the graphic displayed on the second display screen, and the rest of the graphic displayed on the third display screen, without displaying an opaque bar at edges where the first display screen, the second display screen, and the third display screen touch.

19. The electronic device of claim 15, wherein infrared sensors are used to detect proximate display screens.

20. The mobile communication device of claim 1, wherein the plurality of auto-leveling components comprises automatic screws configured to rotate in response to a change in a magnetic field, an electric field, or a radio frequency field.

* * * * *